(12) United States Patent
Aoki et al.

(10) Patent No.: US 9,875,413 B2
(45) Date of Patent: Jan. 23, 2018

(54) VEHICLE MONITORING APPARATUS AND VEHICLE MONITORING METHOD

(71) Applicant: Kabushiki Kaisha Toshiba, Minato-ku, Tokyo (JP)

(72) Inventors: Yasuhiro Aoki, Kawasaki Kanagawa (JP); Toshio Sato, Yokohama Kanagawa (JP); Kentaro Yokoi, Tachikawa Tokyo (JP); Yoshihiko Suzuki, Suginami Tokyo (JP); Kenji Kimiyama, Kawasaki Kanagawa (JP); Junichi Nakamura, Kawasaki Kanagawa (JP); Masahiro Yamamoto, Kawasaki-shi, Kangawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 66 days.

(21) Appl. No.: 15/002,250

(22) Filed: Jan. 20, 2016

(65) Prior Publication Data

US 2016/0171312 A1   Jun. 16, 2016

Related U.S. Application Data

(63) Continuation of application No. PCT/JP2014/069196, filed on Jul. 18, 2014.

(30) Foreign Application Priority Data

Jul. 22, 2013  (JP) .................................. 2013-152080

(51) Int. Cl.
*G06K 9/00* (2006.01)
*G08G 1/015* (2006.01)
(Continued)

(52) U.S. Cl.
CPC ....... *G06K 9/00785* (2013.01); *G06K 9/3258* (2013.01); *G06T 7/20* (2013.01);
(Continued)

(58) Field of Classification Search
CPC combination set(s) only.
See application file for complete search history.

(56) References Cited

U.S. PATENT DOCUMENTS 5,999,877 A * 12/1999 Takahashi .......... G06K 9/00785
340/905
8,284,996 B2 * 10/2012 Winkler ................. G08G 1/017
382/104

(Continued)

FOREIGN PATENT DOCUMENTS

JP   S63-122000 A   5/1988
JP   H10-049662 A   2/1998
(Continued)

OTHER PUBLICATIONS

M. Pedesoli, et al., "A coarse-to-fine approach for fast deformable object detection," CVPR2011—9 pages.

(Continued)

*Primary Examiner* — Tsung-Yin Tsai
(74) *Attorney, Agent, or Firm* — Knobbe, Martens, Olson & Bear, LLP (57) ABSTRACT

An embodiment of a vehicle monitoring apparatus has a determiner and a reader. The determiner determines whether or not a specific site of a vehicle exists at least in an area of an image, the image imaged by an imager, the area being one of multiple areas into which the image is divided by dividing line that are substantially orthogonal to a direction of travel of the vehicle. The reader reads information on a license plate mounted to the vehicle from the area in case that the determiner determines the specific site of the vehicle is determined to exist in the area.

7 Claims, 10 Drawing Sheets

(51) Int. Cl.
  *G08G 1/017* (2006.01)
  *G08G 1/052* (2006.01)
  *G08G 1/065* (2006.01)
  *G07B 15/06* (2011.01)
  *G06T 7/20* (2017.01)
  *G06K 9/32* (2006.01)
  *G08G 1/04* (2006.01)
  *G08G 1/056* (2006.01)
  *H04N 7/18* (2006.01)

(52) U.S. Cl.
  CPC .......... *G07B 15/063* (2013.01); *G08G 1/015* (2013.01); *G08G 1/0175* (2013.01); *G08G 1/04* (2013.01); *G08G 1/052* (2013.01); *G08G 1/056* (2013.01); *G08G 1/065* (2013.01); *H04N 7/181* (2013.01); *G06K 2209/15* (2013.01); *G06T 2207/30236* (2013.01); *G06T 2207/30242* (2013.01)

(56) References Cited

U.S. PATENT DOCUMENTS

| | | | | |
|---|---|---|---|---|
| 8,331,621 | B1* | 12/2012 | Allen | G08G 1/015 235/384 |
| 8,698,895 | B2* | 4/2014 | Nerayoff | H04N 7/181 348/148 |
| 9,183,746 | B2* | 11/2015 | Wu | G08G 1/054 |
| 2005/0201592 | A1* | 9/2005 | Peach | G06K 9/3258 382/104 |
| 2008/0292211 | A1* | 11/2008 | Frantz | G01N 21/8806 382/284 |
| 2009/0136141 | A1* | 5/2009 | Badawy | G06F 17/30781 382/225 |
| 2011/0103647 | A1* | 5/2011 | Leopold | G08G 1/015 382/103 |
| 2011/0182473 | A1* | 7/2011 | Wang | G08G 1/04 382/103 |
| 2013/0236063 | A1* | 9/2013 | Shin | G08G 1/017 382/105 |

FOREIGN PATENT DOCUMENTS

| | | |
|---|---|---|
| JP | 2893814 | 5/1999 |
| JP | 2003-067886 A | 3/2003 |
| JP | 2003-217081 | 7/2003 |
| JP | 2003-217083 A | 7/2003 |
| JP | 2003-217084 | 7/2003 |
| JP | 2004-096509 A | 3/2004 |
| JP | 2004-206441 A | 7/2004 |
| JP | 2006-119846 A | 5/2006 |
| JP | 2007-026300 A | 2/2007 |
| JP | 4690657 B2 | 6/2011 |
| JP | 4901676 B2 | 3/2012 |

OTHER PUBLICATIONS

International Search Report dated Oct. 14, 2014 of PCT/JP2014/069196—3 pages.

Search Report dated Feb. 28, 2017 in European Application No. 14830077.5, 10 pgs.

\* cited by examiner

| STATE | MEANING | AREA AR1 (FAR SIDE) | AREA AR2 (INTERMEDIATE) | AREA AR3 (NEAR SIDE) |
|---|---|---|---|---|
| S0 | NO VEHICLE | × | × | × |
| S1 | ENTRY | F | × | × |
| S2 | RESIDENT WITHIN AREA | × | B | × |
| | | B | F | × |
| | | × | R | B |
| | | R | B | F |
| | | F | R | B |
| | | R | R | R |
| S3 | EXIT | × | × | R |
| S4 | 2 VEHICLES APPROACHING | B | F | R |
| | | F | × | R |

F : FRONT PORTION    B : BODY PORTION    R : REAR PORTION    × : NOT DETECTED

| TIME | LANE 1 | LANE 2 |
|---|---|---|
|  |  |  |
| Tn+N |  | MB1 |
| Tn+N-1 | MB2 |  |
| .. | .. | .. |
| Tn+1 | .. | .. |
| Tn | .. | .. |

⇐

| TIME | LANE 1 | LANE 2 |
|---|---|---|
|  |  |  |
| Tn |  | MB1 |
| Tn-1 |  | MB2 |
| Tn-2 | .. | .. |
| .. | .. | .. |
| .. | .. | .. |

FIG. 16

VEHICLE MONITORING APPARATUS AND VEHICLE MONITORING METHOD

TECHNICAL FIELD

Embodiments of the present invention relate to a vehicle monitoring apparatus for monitoring a vehicle, and to a vehicle monitoring method.

BACKGROUND

Systems that photograph a roadway or the like using a camera, detect a vehicle in an imaged image, and read in information described on a license plate, are known. Such systems may be mounted at an entrance or an exit or a toll road, for example, in order to recognize a passing vehicle. Reading information described on a vehicle license plate from a cameran image and then performing character recognition processing on the overall image may cause the processing load to become excessive, and information may not be able to be read in efficiently. Refer to JP 4690657.

SUMMARY

An embodiment of a vehicle monitoring apparatus has a determiner and a reader. The determiner determines whether or not a specific site of a vehicle exists at least in an area of an image, the image imaged by an imager, the area being one of multiple areas into which the image is divided by dividing line that are substantially orthogonal to a direction of travel of the vehicle. The reader reads information on a license plate mounted to the vehicle from the area in case that the determiner determines the specific site of the vehicle is determined to exist in the area.

DETAILED DESCRIPTION

Embodiments of a vehicle monitoring apparatus and a vehicle monitoring method are explained below with reference to the drawings.

First Embodiment

[Configuration]

Figure 1:
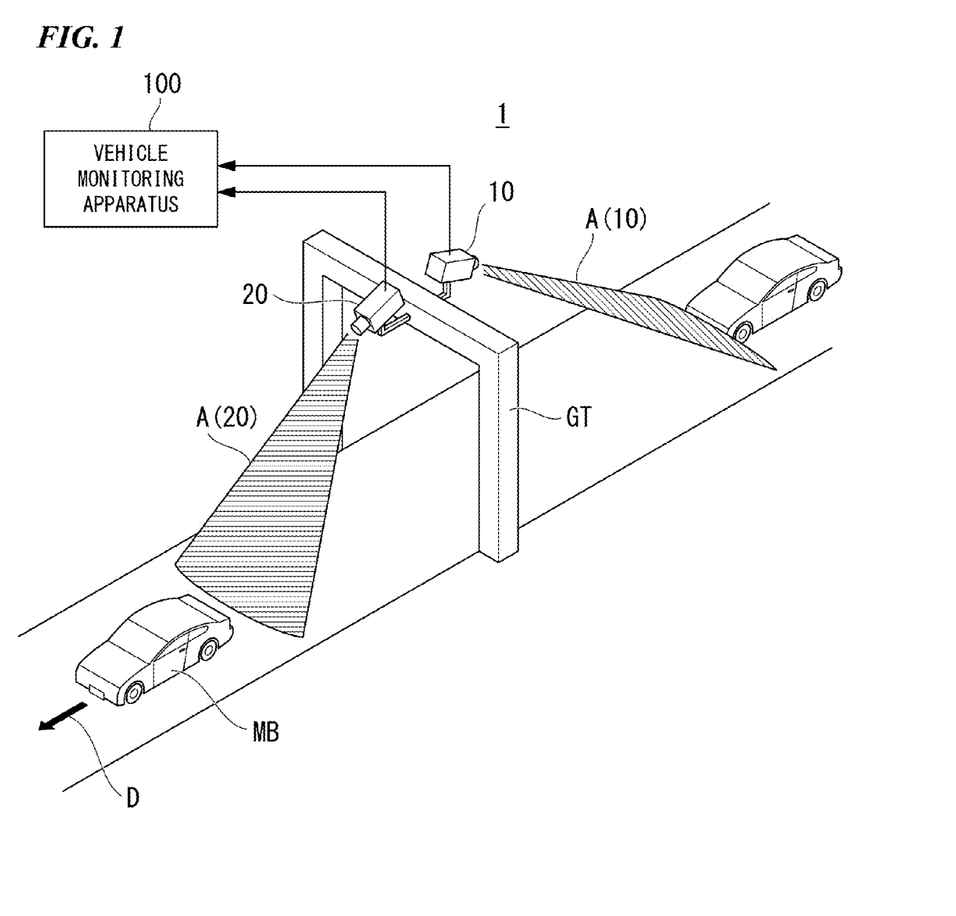
FIG. 1 is a diagram illustrating a state where cameras 10 and 20 included in a vehicle monitoring system 1 of a first embodiment are mounted to a gantry GT.

FIG. 1 is a diagram illustrating a state where cameras 10 and 20 included in a vehicle monitoring system 1 of a first embodiment are mounted to a gantry GT. In FIG. 1, D indicates a direction of travel of a vehicle MB. The gantry GT is a gantry of an automatic fee collection system, for example. The cameras 10 and 20 may be cameras provided with an image sensor such as a charge coupled device ("CCD") or a complementary metal oxide semiconductor ("CMOS"), for example.

Figure 2A:
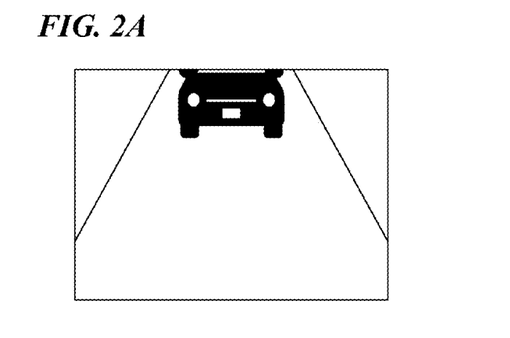
FIG. 2A is a diagram illustrating an example of an image taken by the camera 10.
Figure 2B:
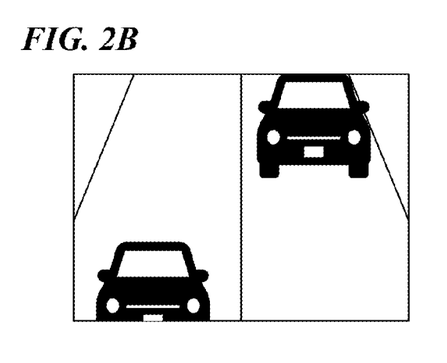
FIG. 2B is a diagram illustrating an example of an image taken by the camera 10.

The camera 10 images an image from diagonally above a front of the vehicle MB approaching and passing through the gantry GT. In FIG. 1, A(10) illustrates an imaging area of the camera 10. Further, the camera 20 images an image from diagonally above a rear of the vehicle MB passing through and moving away from the gantry GT. In FIG. 1, A(20) illustrates an imaging area of the camera 20. The cameras 10 and 20 image an image capture from 7 meters above a roadway at an angle of depression on the order of 45 degrees, for example. The cameras 10 and 20 are controlled to image repeatedly at predefined periods. Note that the cameras 10 and 20 installation locations are not limited to those of FIG. 1. The cameras 10 and 20 may also be set at other locations where image capture of a front and a rear of a vehicle is possible. Images imaged by the cameras 10 and 20 are sent to a vehicle monitoring apparatus 100. FIG. 2A and FIG. 2B are diagrams illustrating examples of images imaged by the camera 10. The camera 10 may mainly take images of one lane, as illustrated in FIG. 2A, and may also take images of multiple lanes simultaneously, as illustrated in FIG. 2B.

By performing image capture from the front and the rear of the vehicle MB, license plate recognition can be performed on vehicles having a license plate only on the rear of the vehicle, such as a two wheel vehicle. Further, even if a license plate on the vehicle MB is obscured during roadway congestion by a vehicle directly in front of the vehicle MG in an image taken from the front of the vehicle MB, it may be possible to recognize a license plate on the rear of the vehicle MB from an image imaged from behind the vehicle MB.

Figure 3:
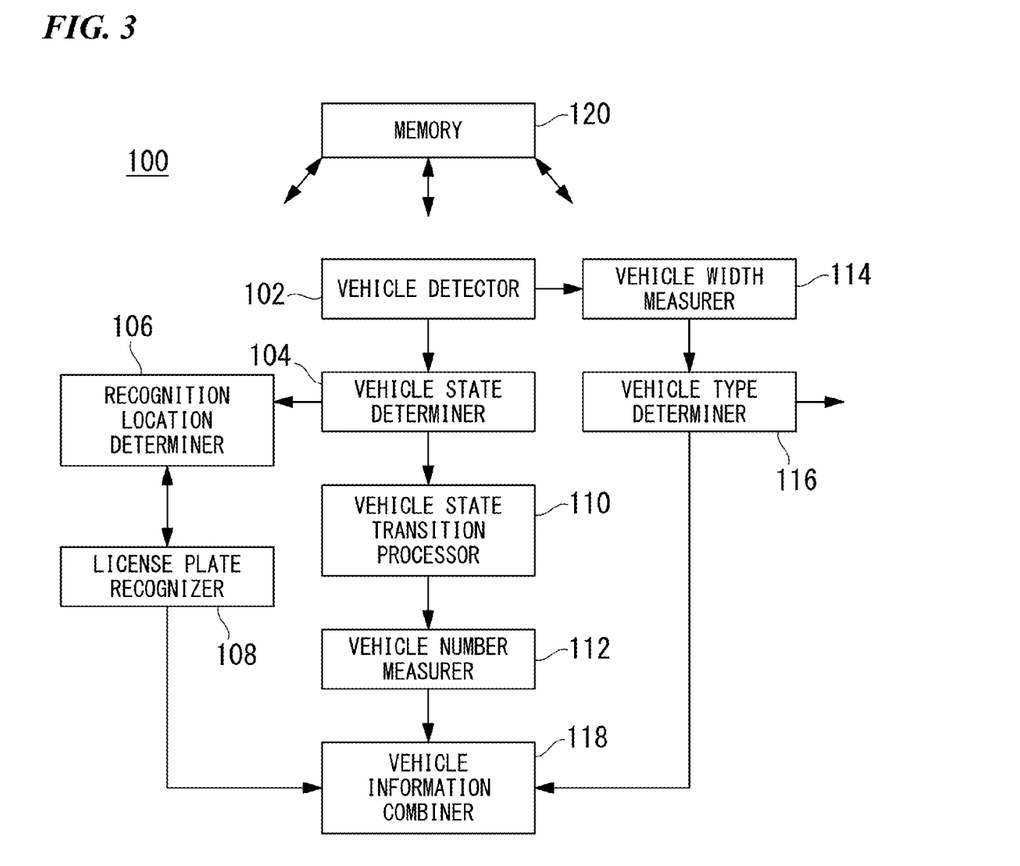
FIG. 3 is a diagram illustrating an example of a functional configuration of a vehicle monitoring apparatus 100 of the first embodiment.

The vehicle monitoring apparatus 100 can be set up in an arbitrary location. FIG. 3 is a diagram illustrating an example of a functional configuration of the vehicle monitoring apparatus 100 of the first embodiment. The vehicle monitoring apparatus 100 is provided with, for example, a vehicle detector 102, a vehicle state determiner 104, a recognition location determiner 106, a number recognition portion 108, a vehicle state transition processor 110, a vehicle number measurer 112, a vehicle width measurer 114, a vehicle type determiner 116, a vehicle information combiner 118, and a Memory 120. Each functional portion may be a software functional portion that functions by a central processing unit ("CPU") executing a program stored in the Memory 120, for example. Note that each functional portion may instead be a hardware functional portion such as large scale integration ("LSI") or an application specific integrated circuit ("ASIC"), or the like, for example. The Memory 120 may be a hard disk drive ("HDD"), a flash memory, a random access memory ("RAM"), a read only memory ("ROM"), or the like, for example.

[Vehicle Site Identification]

The vehicle detector 102 determines whether or not a portion (site) of a vehicle exists within an image imaged by the camera 10 or 20. The vehicle detector 102 configures a discriminator configured by, for example, edge emphasized characteristic amounts, gradient amounts, brightness amounts, and the like, for sites that configure a vehicle, such as a vehicle front portion, body portion, and rear portion, and by patterns thereof. Edge emphasis may be performed by using Sobel filter processing or the like. The vehicle detector 102 specifies a type and location of a vehicle site existing within an image by using the configured discriminator.

Reference: M. Pedersoli, A. Vadaldi, J. Gonzalez, Coarse-to-fine approach for fast deformable object detection, CVPR, 2011.

Figure 4A:
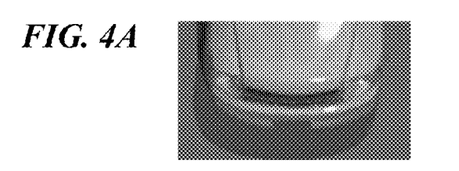
FIG. 4A is a diagram of a front portion image cut out from an imaged image.
Figure 4B:
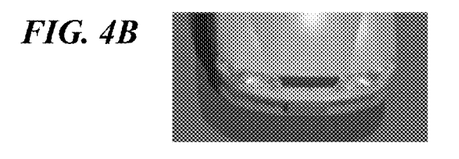
FIG. 4B is a diagram of a front portion image cut out from an imaged image.
Figure 4C:
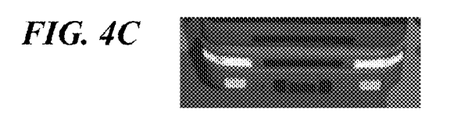
FIG. 4C is a diagram of a front portion image cut out from an imaged image.
Figure 5A:
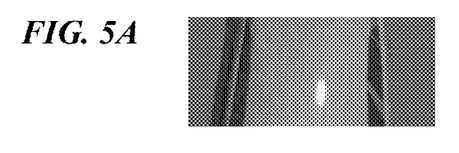
FIG. 5A is a diagram of a body portion image cut out from an imaged image.
Figure 5B:
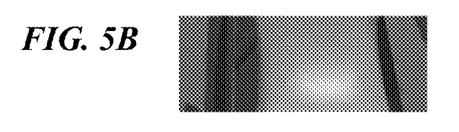
FIG. 5B is a diagram of a body portion image cut out from an imaged image.
Figure 5C:
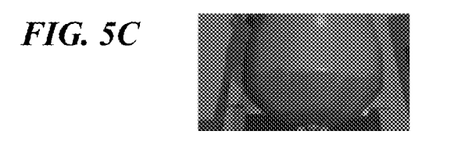
FIG. 5C is a diagram of a body portion image cut out from an imaged image.
Figure 6A:
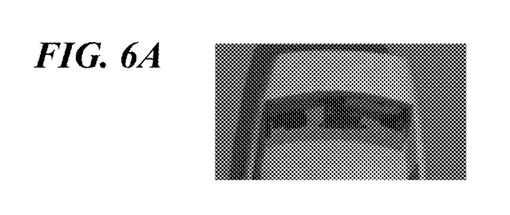
FIG. 6A is a diagram of a rear portion image cut out from an imaged image.
Figure 6B:
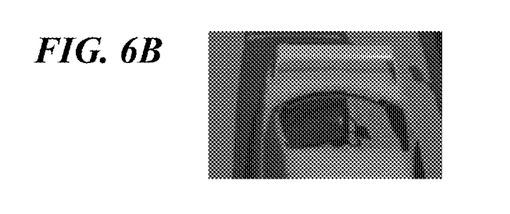
FIG. 6B is a diagram of a rear portion image cut out from an imaged image.
Figure 6C:
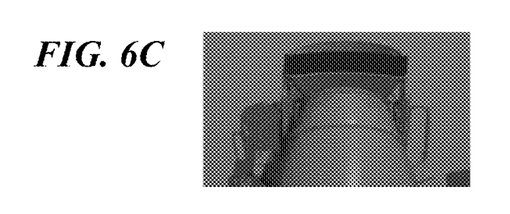
FIG. 6C is a diagram of a rear portion image cut out from an imaged image.

FIG. 4A to FIG. 4C are diagrams of front portion images cut out from imaged images. Front portions include constituent elements such as headlamps, front grills, bumpers, license plates, and the like. The discriminator is configured to combine together and be capable of detecting the constituent elements. The vehicle detector 102 can thus specify a front portion, with a high degree of precision, corresponding to the position of constituent elements that differ according to vehicle type. FIG. 5A to 5C are diagrams of body portion images cut out from imaged images. Body portions have simple shapes including mainly vehicle roofs, but may have very complex shapes when the vehicle is a service vehicle or the like. For such cases, the vehicle detector 102 may use a service vehicle body portion discriminator pre-pared in advance. FIG. 6A to 6C are diagrams of rear portion images cut out from imaged images.

Figure 7A:
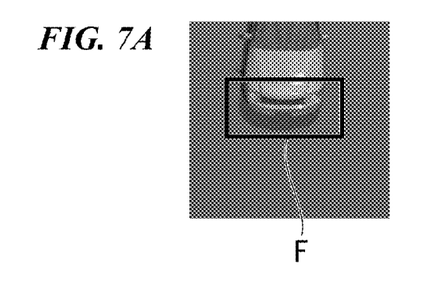
FIG. 7A is a diagram of a time sequence image imaged by the camera 10 arranged in order of capture.
Figure 7B:
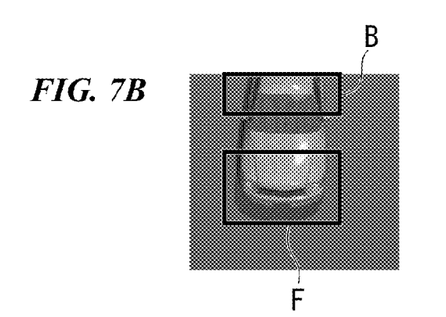
FIG. 7B is a diagram of a time sequence image imaged by the camera 10 arranged in order of capture.
Figure 7C:
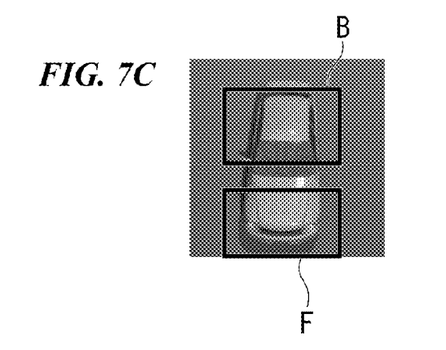
FIG. 7C is a diagram of a time sequence image imaged by the camera 10 arranged in order of capture.
Figure 7D:
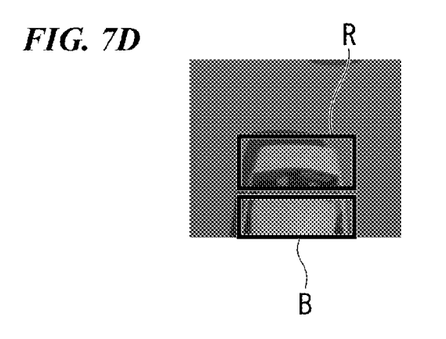
FIG. 7D is a diagram of a time sequence image imaged by the camera 10 arranged in order of capture.

FIG. 7A to 7D are diagrams of a time sequence of images imaged by the camera 10 arranged in order of capture. In response to advancement of the vehicle MB, the image illustrated in FIG. 7A is imaged first, following which the image illustrated in FIG. 7B is imaged. The image illustrated in FIG. 7C is imaged next, and the image illustrated in FIG. 7D is then imaged. In FIG. 7A to FIG. 7D, F denotes a front portion identified by the vehicle detector 102, B denotes a body portion identified by the vehicle detector 102, and R denotes a rear portion identified by the vehicle detector 102.

[Vehicle State Judgement]

Figure 8:
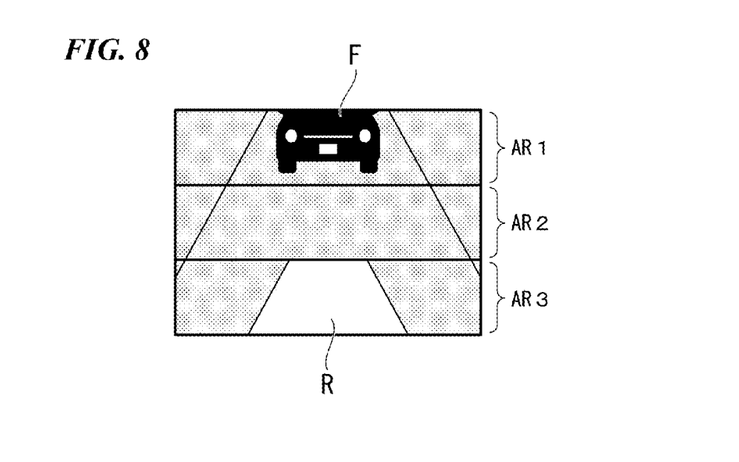
FIG. 8 is a diagram illustrating a state where an image is divided into areas AR1 to AR3.

The vehicle state determiner 104 divides the images imaged by the cameras 10 and 20 into thirds using dividing lines in a horizontal direction of the image, for example, and then determines whether or not a front portion, a body portion, or a rear portion is within each area AR1 to AR3. The horizontal direction division lines are straight lines substantially perpendicular to a direction in which the vehicle is advancing. In order to simplify the explanation, processing of images imaged by the camera 10 is mainly explained below. FIG. 8 is a diagram illustrating a state where an image is divided into the areas AR1 to AR3.

[License Plate Recognition]

The recognition location determiner 106 refers to judgement results obtained by the vehicle state determiner 104, and determines whether or not a front portion (F) exists in the area AR2. For cases where the front portion (F) exists in the area AR2, the recognition location determiner 106 causes the number recognition portion 108 to perform license plate recognition. The number recognition portion 108 scans a scanning area within the area AR2 (for example, a site in a direction from a front end portion of a vehicle recognized as the front portion (F) toward a depth direction of the image), specifies an area (license plate area) occupied by a license plate, performs character recognition processing within the license plate area, and reads out information described on the license plate.

The recognition location determiner 106 may also cause the number recognition portion 108 to perform license plate recognition for cases where it has not been determined that the front portion (F) exists in the area AR2, but instead exists within any of the area AR2 and the area AR1. Further, the recognition location determiner 106 may reference judgement results from the vehicle type determiner 116, described below, and cause the number recognition portion 108 to perform license plate recognition for cases where the front portion (F) exists in an optimal area corresponding to vehicle type.

In each case, an image in which the front portion (F) is shown in the area AR2 (or in the area AR1) is temporarily stored in the memory 120 from when a vehicle exits from the vicinity of the gantry GT. Recognition omissions by the number recognition portion 108 can thus be reduced.

The number recognition portion 108 extracts components in the scanning area having a frequency equal to or less than a specific frequency, performs binarization processing or the like, and in addition, uses a labeling method or the like to segment character candidate areas. Areas having a size or length to width ratio far different from a target character area are then removed from the character candidate areas, and character recognition is performed (refer to JP 4901676). Information obtained by character recognition includes consecutive numbers, Land Transport Office information, classification numbers, usage codes, vehicle type codes, and the like. The number recognition portion 108 thus reads in information (characters) described on a license plate using this type of processing, and outputs a character recognition score to the recognition location determiner 106. For cases where the character recognition score is lower than a standard value, the recognition location determiner 106 again causes the number recognition portion 108 to read in characters, taking the image in which the front end portion (F) is shown in the area AR2, or the like, as an object.

The vehicle monitoring apparatus 100 of the present embodiment can thus reduce a scanning area used for reading in information described on a license plate of a vehicle, and efficiently read in the information stored in the license plate, for cases where the vehicle license plate is easily read and the front portion (F) exists in the area AR2 (or in the area AR1).

That is, a process for identifying the front portion (F) can be performed by using a process for identifying boundaries between a roadway and a vehicle, which has a relatively small amount of processing load and can have a high degree of precision. The vehicle monitoring apparatus 100 can thus quickly, and with a low processing load, narrow down areas within images where a license plate may exist. Information described on a license plate can thus be read in efficiently when compared to scanning for a license plate from an entire image.

The number recognition portion 108 may make corrections to, or narrow down, an area to be scanned based on judgement results from the vehicle type judgement portion 116 described below. For example, for a case where the vehicle type determiner 116 determines that a vehicle does not have a license plate in a center portion, the number recognition portion 108 corrects or narrows down a scanning area to a location based on the deviation of the license plate from the center portion. As a result, the vehicle monitoring apparatus 100 can quickly, and with a low processing load, narrow down an area within an image where a license plate may exist, and can read in information described on a vehicle license plate even more efficiently.

On the other hand, the recognition location determiner 106 determines whether or not a rear portion (R) exists in the area AR2 (or in the area AR3) in an image imaged by the camera 20. For cases where the rear portion (R) exists in the area AR2 (or in the area AR3), the number recognition portion 108 scans a scanning area within the area AR2 (or within the area AR3), (for example, an area in a direction from a rear end portion of a vehicle recognized as the rear portion (R) toward a depth direction of the image), specifies an area (license plate area) occupied by a license plate, performs character recognition processing within the license plate area, and reads out information described on the license plate.

[Measurement of Number of Vehicles]

Figure 9:
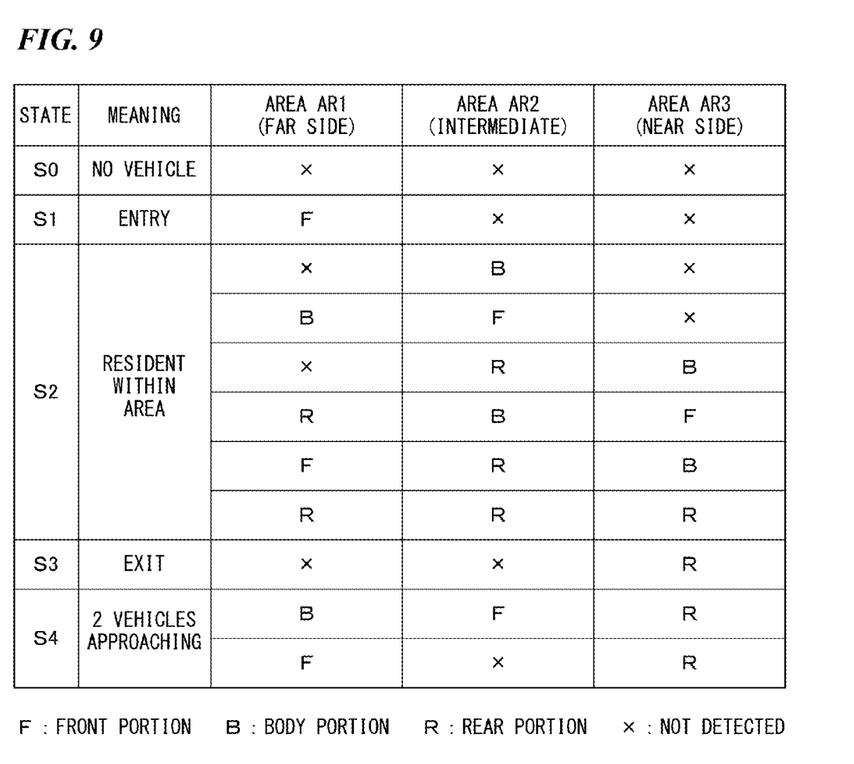
FIG. 9 is a diagram illustrating an example of a relative relationship between states and vehicle sites existing in each area.
Figure 10:
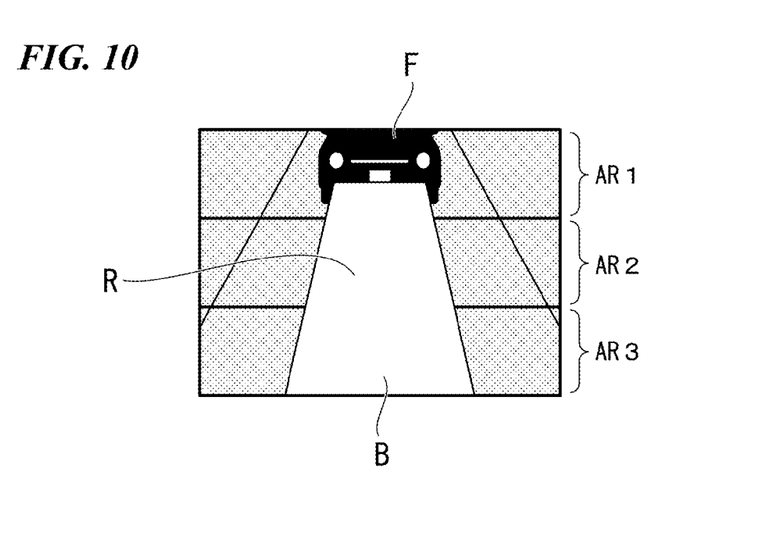
FIG. 10 is a diagram illustrating another example of a vehicle state.

The vehicle state transition processor 110 references judgement results from the vehicle state judgement portion 104, and classifies states of vehicles within images imaged by the camera 10 by combining the front portion (F), the body portion (B), and the rear portion (R) existing in the areas AR1 to AR3. The vehicle state transition processor 110 classifies states of vehicles within images imaged by the camera 10 into, for example, S0 "no vehicle", S1 "entering", S2 "resident within area", S3 "leaving", and S4 "2 vehicles approaching". FIG. 9 is a diagram illustrating an example of a relative relationship between states and vehicle sites existing in each area. In FIG. 9, "x" indicates that the location of a vehicle has not been determined by the vehicle detector 102 within the pertinent area. Note that the state of FIG. 8 corresponds to S4 "2 vehicles approaching" because the front portion (F) of a vehicle has not been identified in the area AR1 and the rear portion (R) of a vehicle has not been identified in the area AR3. Further, FIG. 10 is a diagram showing another example of a vehicle state. The state of FIG. 10 corresponds to S2 "resident within area" because the front portion (F) of a vehicle has been identified in the area AR1, the rear portion (R) of a vehicle has been identified in the area AR2, and the body portion (B) of a vehicle has been identified in the area AR3. On the other hand, the vehicle state transition processor 110 classifies states of vehicles in images from the camera 20 in a reverse sequence of the areas AR1 to AR3 to generate a corresponding relationship to FIG. 9.

Figure 11:
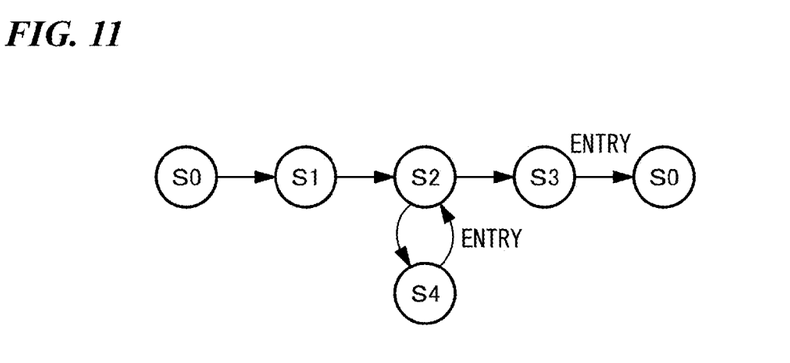
FIG. 11 is a diagram modeling a vehicle state change when using an image of the camera 10.
Figure 12:
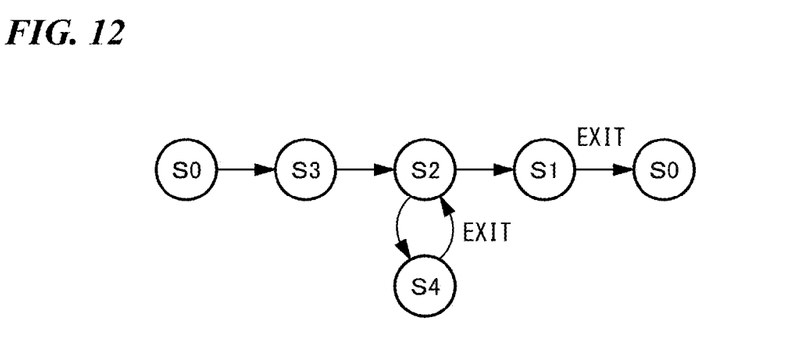
FIG. 12 is a diagram modeling a vehicle state change when using an image of the camera 20.

The vehicle number measurer 112 references changes in states of vehicles classified by the vehicle state transition processor 110, and performs vehicle number computations from change patterns. FIG. 11 is a diagram modeling a vehicle state change when using an image of the camera 10. When using a model of FIG. 11, the vehicle number measurer 112 determines that one vehicle has advanced to an area below the gantry GT when there is a transition from S4 to S2 and a transition from S3 to S0. Further, FIG. 12 is a diagram modeling a vehicle state change when using an image of the camera 20. When using a model of FIG. 12, the vehicle number computer portion 112 determines that one vehicle has departed from an area below the gantry GT when there is a transition from S4 to S2 and a transition from S1 to S0.

By performing this type of judgement, the vehicle monitoring apparatus 100 of the present embodiment can perform vehicle number computations with few omissions even for cases where, for example, a portion of vehicles are seen overlapping due to traffic. Further, the vehicle number measurer 112 releases areas in which information, such as unnecessary images of vehicles determined to be leaving from an area below the gantry GT, is stored. Wasteful use of memory 120 resources can thus be prevented.

[Vehicle Width, Vehicle Type, Information Combination]

Figure 13:
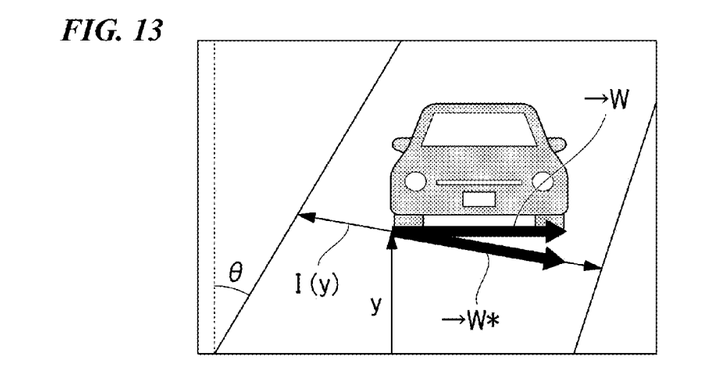
FIG. 13 is a diagram for explaining an example of a measurement method according to a vehicle width measurer 114.

The vehicle width measurer 114 measures a width of a vehicle from vehicle external contours in images imaged by the camera 10. FIG. 13 is a diagram for explaining an example of a measurement method according to the vehicle width measurer 114. The vehicle width measurer 114 may measure a vehicle width based on, for example, a roadway width L(y), stored in advance in the Memory 120 for each longitudinal position y of an image, and a roadway width direction angle θ in the image. That is, taking a lower portion vector of a vehicle external contour as →W (where → indicates a vector), the vehicle width measurer 114 maps this to a vector →W* parallel to a roadway width direction. The vehicle width measurer 114 then finds a ratio between the vector →W* and a roadway width L(y) on the image at each longitudinal position y, and multiples the ratio by the road width L(y) taking the origin of the vector →W* as a longitudinal position y, thus measuring vehicle width.

The vehicle type determiner 116 combines shape patterns such as the front portion (F) detected by the vehicle detector 102 and vehicle widths measured by the vehicle width measurer 114, and determines a vehicle type of the vehicle shown in the image imaged by the camera 10. The vehicle type determiner 116 classifies types of vehicles, such as "two wheel vehicle", "light automobile", "standard vehicle", "large vehicle", "other", and "unable to determine". Among these, determination is performed based on shape patterns of the front portion (F) for "two wheel vehicles" and for four wheel vehicles. Determination is performed based on shape patterns such as the front portion (F) and on vehicle width for four wheel vehicles.

The vehicle information combiner 118 performs vehicle management by combining the number of vehicles measured by the vehicle number measurer 112, recognition results found by the number recognition portion 108 obtained for each vehicle, and information such as vehicle width determined by the vehicle width determiner 116, and associating these with vehicle pass through times. For "two wheel vehicles", there is no license plate information in images taken from in front of the vehicles. Therefore, although information from the camera 10 is insufficient, the information can be supplemented based on information from the camera 20.

[Summary]

The vehicle monitoring apparatus 100 of the present embodiment can perform identification of boundaries between a roadway and a vehicle with relatively low processing load and a high degree of precision, and can narrow down an area to be scanned by using a process to identify a front portion (F). As a result, information described on a license plate of a vehicle can be read in efficiently compared to scanning for a license plate form an entire image.

Further, with the vehicle monitoring apparatus 100 of the present embodiment, the number recognition portion 108 can narrow down an area within an image where a license plate may exist quickly, and with a low processing load. The vehicle monitoring apparatus 100 can read in information described on a license plate of a vehicle with additional efficiency by correcting or narrowing down an area to be scanned based on determination results from the vehicle type determiner 116.

Furthermore, with the vehicle monitoring apparatus 100 of the present embodiment, the vehicle number measurer 112 can perform vehicle number measurements with few omissions because measurement of the number of vehicles is performed from vehicle state change patterns classified by the vehicle state transition processor 110.

Second Embodiment

Figure 14:
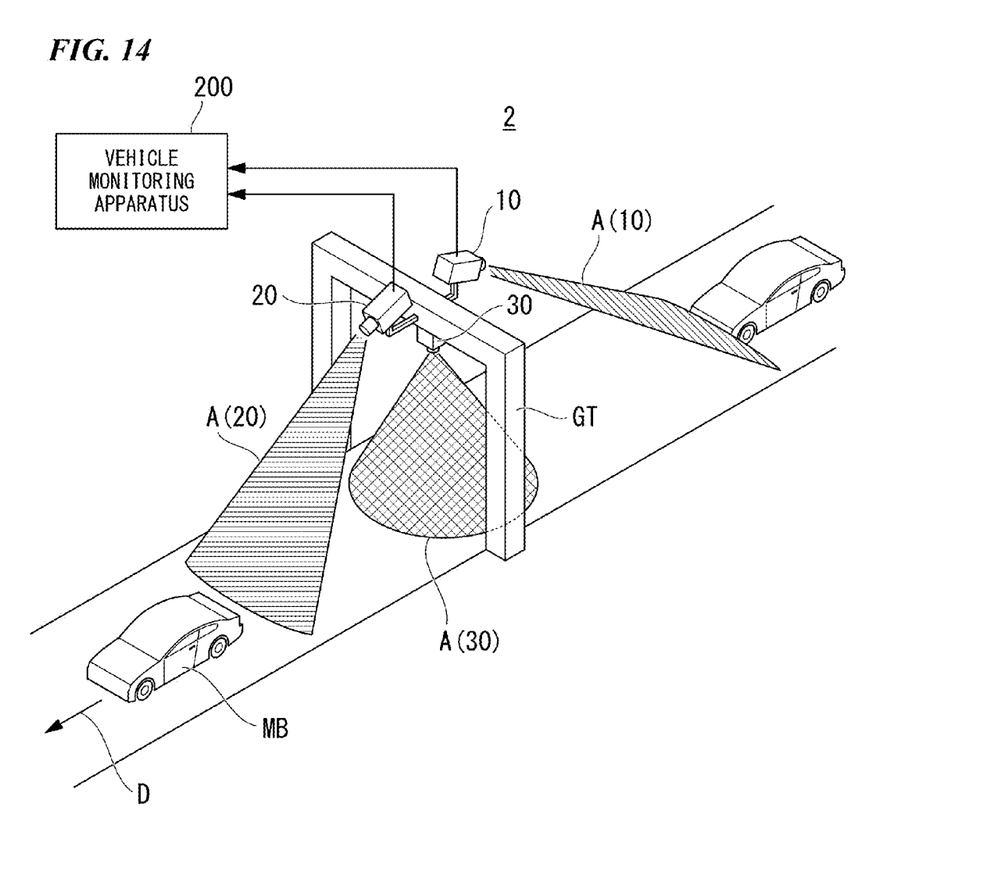
FIG. 14 is a diagram illustrating a state where cameras 10, 20, and 30 included in a vehicle monitoring system 2 of a second embodiment are mounted to the gantry GT.

A second embodiment of a vehicle monitoring system 2 and a vehicle monitoring apparatus 200 is explained below. FIG. 14 is diagram illustrating a state where the cameras 10, 20, and a camera 30 included in the vehicle monitoring system 2 of the second embodiment are mounted to the gantry GT. The cameras 10, 20, and 30 are cameras provided with an imaging element such as a CCD or CMOS, for example. The cameras 10 and 20 are similar to those used in the first embodiment, and therefore an explanation thereof is omitted. The camera 30 images an area directly below the gantry GT. In FIG. 14, A(30) indicates an image capture area of the camera 30. The capture area A(30) of the camera 30 is set to cover a blind area not in the imaging areas A(10) and A(20). Further, the cameras 10, 20, and 30 are controlled to perform repeated image capture at a predefined period. Images imaged by the cameras 10, 20, and 30 are sent to the vehicle monitoring apparatus 200.

By thus performing image capture from the front, rear, and directly above the vehicle MB, state changes up to a later image capture by the camera 20 can be understood without omission. Pronounced effects may be seen for cases where the gantry GT is suspended astride two or more lanes, for example.

Figure 15A:
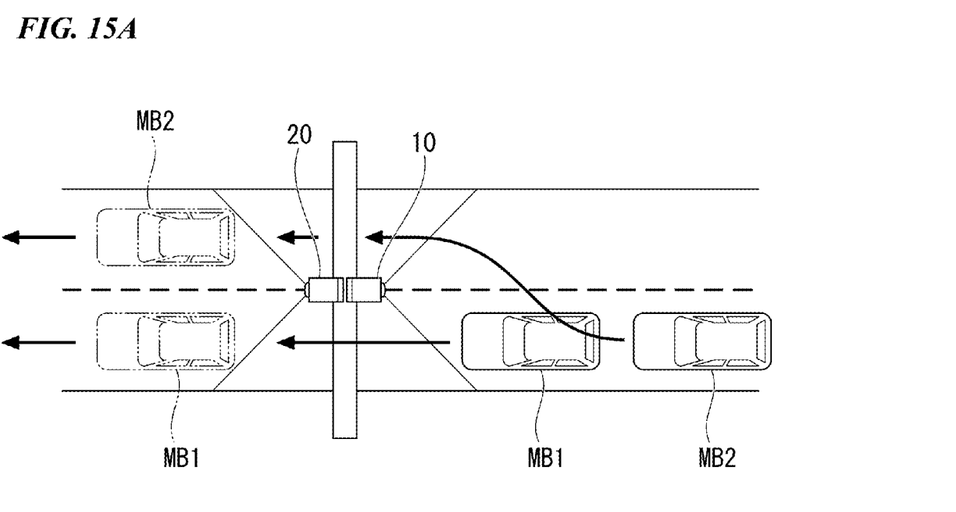
FIG. 15A is a diagram illustrating a condition where the gantry GT is suspended astride two lanes, a lane 1 and a lane 2, and a vehicle MB2 has passed a vehicle MB1 directly beneath the gantry GT.
Figure 15B:
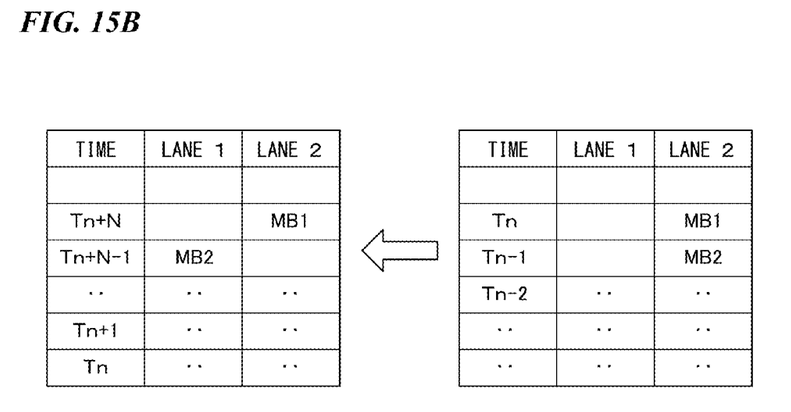
FIG. 15B is a diagram illustrating an example of information stored in a memory 120 by understanding information regarding the vehicles MB1 and MB2 using a vehicle monitoring apparatus 200.

FIG. 15A and FIG. 15B are diagrams illustrating conditions where vehicles traveling in multiple lanes are reliably recognized by the vehicle monitoring system 2 of the second embodiment. The image capture areas A(10), A(20), and A(30) of the cameras 10, 20, and 30 span multiple lanes. FIG. 15A is a diagram illustrating a condition where the gantry GT is suspended astride two lanes, a lane 1 and a lane 2, and a vehicle MB2 has passed a vehicle MB1 directly beneath the gantry GT. In this case, if the camera 30 for capturing images directly beneath the gantry GT did not exist, the vehicle MB1 and the vehicle MB2, which are lined up serially imaged by the camera 10, appear side by side in an image imaged by the camera 20, and there are times when it is difficult to identify both of the vehicles.

With the vehicle monitoring system 2 of the second embodiment, however, the passing movement of the vehicle MB2 can be understood from images imaged by the camera 30, and vehicle identification can thus be performed very reliably. FIG. 15B is a diagram illustrating an example of information stored in the Memory 120 (described below) by understanding information regarding the vehicles MB1 and MB2 using the vehicle monitoring apparatus 200.

Figure 16:
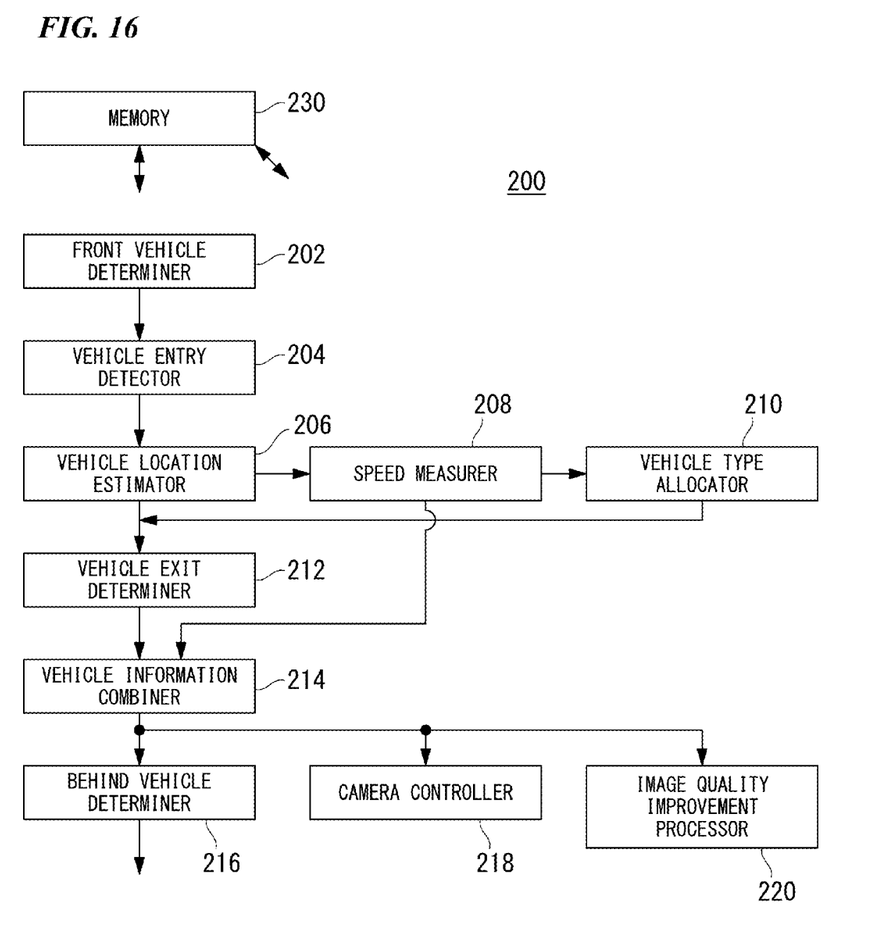
FIG. 16 is a diagram illustrating an example of a functional configuration of a vehicle monitoring apparatus 200 relating to the second embodiment.

The vehicle monitoring apparatus 200 can be set in an arbitrary location. FIG. 16 is a diagram illustrating an example of a functional configuration of the vehicle monitoring apparatus 200 relating to the second embodiment. The vehicle monitoring apparatus 200 is provided with, for example, a front vehicle determiner 202, a vehicle entry detector 204, a vehicle location estimator 206, a speed measurer 208, a vehicle type allocator 210, a vehicle exit determiner 212, a vehicle information combiner 214, a behind vehicle determiner 216, a camera controller 218, an image quality improvement processor 220, and a memory 230, for example. The functional portions may be software functional portions that function by a CPU in the vehicle monitoring apparatus 200 executing a program stored in the memory 230. Note that each functional portion may instead be a hardware functional portion such as large scale integration ("LSI") or an application specific integrated circuit ("ASIC"), or the like, for example.

The front vehicle determiner 202 performs processing similar to that of the vehicle state determiner 104 and the recognition location determiner 106 in the first embodiment from images imaged by the camera 10, for example. Thee front vehicle determiner 202 identifies locations and the like of vehicles moving toward the gantry GT and entering, and reads in information described on a vehicle license plate thereof. As illustrated in FIG. 15A or in FIG. 15B, for cases where the gantry GT spans multiple lanes, vehicle locations and information described on a license plate are stored in the Memory 230 along with driving lane information. The vehicle entry detector 204 receives location and time measurement information for a vehicle entering directly beneath the gantry GT from the front vehicle determiner 202, and detects that an object having the size of a vehicle has entered.

The vehicle location estimator 206 estimates the condition at which the vehicle, detected by the vehicle entry detector 204, is moving at each time measurement, and identifies the location of the vehicle at each time measurement. The vehicle location estimator 206 identifies vehicles imaged from directly above by, for example, updating a brightness information template within a vehicle contour area at each time measurement.

The speed measurer 208 measures vehicle speed based on a vehicle location movement amount per unit time identified by the vehicle location estimator 206. For cases where the speed measured by the speed measurer 208 is greatly skewed between vehicles, a report may be made to a warning device or the like because a vehicle may have stopped due to a malfunction or an accident, even if there are vehicles moving at a legally posted speed.

The vehicle type allocator 210 allocates information detected and read in by the front vehicle determiner 202 at vehicle locations identified by the vehicle location estimator 206. In particular, for "two wheel vehicles" information read in by the front vehicle determiner 202, where a license plate is described, does not exist. It is thus difficult to accurately determine the vehicle location.

The vehicle exit determiner 212 determines that a vehicle has exited from an area beneath the gantry GT by determining whether or not the vehicle has gone past a location in the vicinity of an exit, based on the location of the vehicle identified by the vehicle location estimator 206.

The vehicle information combiner 214 combines exit time information and a lane in which a vehicle is moving with information allocated by the vehicle type allocator 210 for each vehicle that exits from an area beneath the gantry GT.

The behind vehicle determiner 216 performs processing similar to that of the vehicle state determiner 104 and the recognition location determiner 106 of the first embodiment. The behind vehicle determiner 216 uses an image imaged by the camera 20 of a vehicle moving in a direction away from the gantry GT, thus identifying vehicle location and reading in license plate information.

The camera controller 218 generates parameter change information that is sent to the camera 20 used by the behind vehicle determiner 216. For example, the camera controller 218 performs control to increase the shutter speed of the camera 20 when the vehicle information combiner 214 finds that there is a vehicle passing through at a conspicuously high speed. Further, for cases where multiple "two wheel vehicles" are detected passing through, control is performed to change zoom information or the like in order to increase resolution. For cases where the vicinity of the gantry GT is lit up by a lighting apparatus, control may be performed by estimating the timing at which a vehicle will enter the imaging area A(20), and setting the light up timing (or adjusting the brightness) accordingly. License plates are required to be mounted to the rear of a vehicle, and therefore the resolution of images imaged by the camera 20 may be set higher than the resolution of images imaged by the camera 10.

The image quality improvement processor 220 performs processing to correct vehicle motion blurriness or the like due to vibrations of the overall gantry GT, for example, on images imaged by the cameras 10 and 20. For cases where adjustments made by the camera controller 218 cannot be made quickly enough, the image quality improvement processor 220 may perform supplemental processing or the like in order to compensate for underexposure or lack of resolution.

In the examples of FIG. 15A and FIG. 15B, the vehicle information combiner 214 receives information that the vehicle MB1 has passed through the vicinity of the entrance at a time of Tn−1, and that the vehicle MB2 has passed through the lane 2 at a time Tn. In addition, as a result of performing identification of each vehicle based on images imaged by the camera 30, it is determined that the vehicle MB2 passes the vehicle MB1, and changes lanes from the lane 2 to the lane 1, before the each vehicle enters the imaging area A(20) of the camera 20. At this point the vehicle information combiner 214 changes vehicle time information, and communicates to the behind vehicle determiner 216 that the vehicle 2 will appear first in an image obtained from the lane 2. Therefore an inconsistency in vehicle management states between the entrance and the exit does not develop, and vehicle arrival information can be determined in advance. Recognition precision can thus be increased.

In accordance with the vehicle monitoring apparatus 200 of the second embodiment explained above, vehicle monitoring is performed using images imaged by the camera 30 to supplement gaps in imaging areas of the camera 10 and the camera 20, and therefore seamless vehicle monitoring can be achieved.

Further, with the vehicle monitoring apparatus 200 of the second embodiment, the camera controller 218 changes parameters sent to the camera 20 using information based on images imaged by the cameras 10 and 30, and therefore a vehicle can be monitored very reliably.

According to at least one embodiment explained above, identification of a boundary between a roadway and a vehicle can be performed with relatively low processing load and with a high degree of precision. By narrowing down an area to be scanned according to front portion (F) identification processing, information described on a vehicle license plate can be read in efficiently.

Note that the vehicle state determiner 104, the recognition location determiner 106, the front vehicle determiner 202, and the behind vehicle determiner 216 in the above embodiments are examples of "determiners" in the scope of the patent claims. Further, the number recognition portion 108, the front vehicle determiner 202, and the behind vehicle determiner 216 in the above embodiments are examples of "readers" in the scope of the patent claims.

Several embodiments of the present invention are explained above. These embodiments are presented as examples, and are not intended to limit the scope of the invention. It is possible to implement a variety of other embodiments. Various omissions, substitutions, and changes that do not depart from the gist of the invention can be made. The embodiments and changes thereto are included in the scope and the gist of the invention, and are included in the invention as described by the scope of patent claims and equivalents thereto.

For example, camera control, image improvement processing, information supplementation by the camera 20, and the like similar to that of the second embodiment may also be performed in the first embodiment. Techniques explained as the first embodiment and techniques explained as the second embodiment can be used in suitable combination.

What is claimed is:

1. A vehicle monitoring apparatus comprising:
   an imager that comprises a first imager that images an image of a front of a vehicle approaching a predefined location, a second imager that images an image of a top of a vehicle passing through the predefined location and a third imager that images an image of a rear of a vehicle moving away from the predefined location,
   a determiner that determines whether or not a specific site of a vehicle exists at least in an area of the image imaged by the imager, the area being one of multiple areas into which the image is divided by one or more dividing lines that are substantially orthogonal to a direction of travel of the vehicle;
   a reader that reads information on a license plate mounted to the vehicle from the area in case that the determiner determines the specific site of the vehicle exists in the area;
   a vehicle location estimator that identifies a location of the vehicle in vicinity of the area at each time measurement based on the image imaged by the second imager, the vehicle being detected from the image imaged by the first imager; and a vehicle type allocator that allocates information at the location of the vehicle, the information read from the image imaged by the first imager.

2. The vehicle monitoring apparatus according to claim 1, wherein the vehicle location estimator detects changing lanes or passing other vehicle of a vehicle in the vicinity of the area, based on the image imaged by the second imager.

3. The vehicle monitoring apparatus according to claim 1, further comprising:

a speed measurer that measures a speed of the vehicle of which location was identified by the vehicle location estimator, based on a movement amount of location of the vehicle per unit time.

4. The vehicle monitoring apparatus according to claim 3, wherein the speed measurer reports a warning device of a possibility that a vehicle may have stopped due to a malfunction or an accident for cases where the speed measured by the speed measurer is greatly skewed between vehicles.

5. The vehicle monitoring apparatus according to claim 3, further comprising:

a camera controller that controls the imager, and a vehicle information combiner that combines exit time information and a lane in which a vehicle is moving which information allocated by the vehicle type allocator for each vehicle that exists from an area beneath a gantry on which the first imager, the second imager and the third imager are mounted, wherein the camera controller increases a shutter speed of the imager when the vehicle information combiner finds that there is a vehicle passing through at a conspicuously high speed.

6. The vehicle monitoring apparatus according to claim 3, further comprising:

a camera controller that controls the imager, wherein the camera controller estimates a timing at which a vehicle will enter the area and let a lighting apparatus light at the timing, the lighting apparatus is located in the vicinity of the area.

7. A method of monitoring a vehicle comprising:

imaging an image of a front of a vehicle approaching a predefined location, an image of a top of a vehicle passing through the predefined location and an image of a rear of a vehicle moving away from the predefined location;

determining whether or not a specific site of a vehicle exists at least in an area of the image, the area being one of multiple areas into which the image is divided by one or more dividing lines that are substantially orthogonal to a direction of travel of the vehicle;

reading information on a license plate mounted to the vehicle from the area in case it is determined that the specific site of the vehicle is exists in the area;

identifying a location of the vehicle in vicinity of the area at each time measurement based on the image of the top of the vehicle, the vehicle being detected from the image of the front of the vehicle; and allocating information at the location of the vehicle, the information read from the front image of the vehicle.

* * * * *